United States Patent

[11] 3,577,112

| [72] | Inventors | John C. Bowen<br>Huntingdon Valley;<br>Howard G. Fischer, II, Hatboro, Pa. |
|---|---|---|
| [21] | Appl. No. | 826,892 |
| [22] | Filed | May 22, 1969 |
| [45] | Patented | May 4, 1971 |
| [73] | Assignee | The Duriron Company, Inc.<br>Dayton, Ohio<br>Continuation-in-part of application Ser. No. 723,030, Apr. 22, 1968, now abandoned. |

[54] APPARATUS FOR HIGH PRESSURE MEASUREMENT
18 Claims, 22 Drawing Figs.

[52] U.S. Cl. .................................................. 338/4, 338/5, 73/398
[51] Int. Cl. .................................................. G01l 1/22
[50] Field of Search .......................................... 338/2, 4, 5; 73/141 (A), 398 (R)

[56] References Cited
UNITED STATES PATENTS

| 2,398,401 | 4/1946 | Bancroft et al. | 73/398(R) |
| 3,046,788 | 7/1962 | Laimins | 73/398(R) |
| 3,376,537 | 4/1968 | Pugnaire | 338/5 |
| 3,389,459 | 6/1968 | Russell | 338/2 |
| 3,413,845 | 12/1968 | Pugnaire | 73/141(A) |

Primary Examiner—Rodney D. Bennett
Assistant Examiner—T. H. Tubbesing
Attorney—Zachary T. Wobensmith, 2nd ABSTRACT: Apparatus for high pressure measurement utilizing strain gauges removably mounted in an opening in an object to which a force, such as fluid pressure, is applied. The mounting is separated from the location of application of the high pressure. The strain gauges are carried on plates or the like or may comprise plates, for ready insertion and removal.

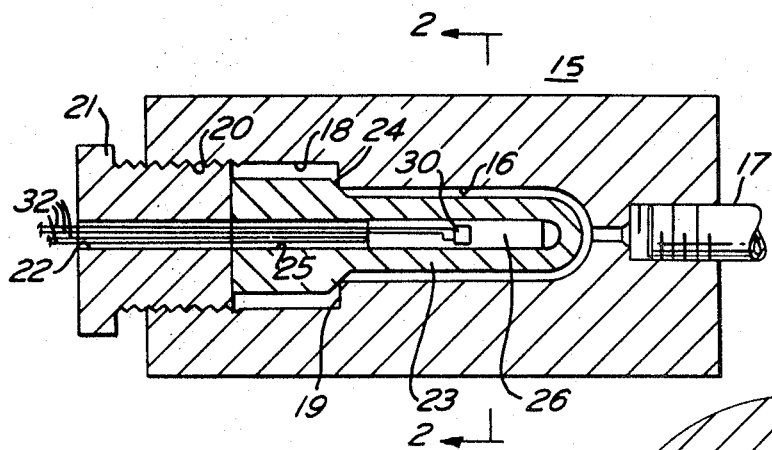
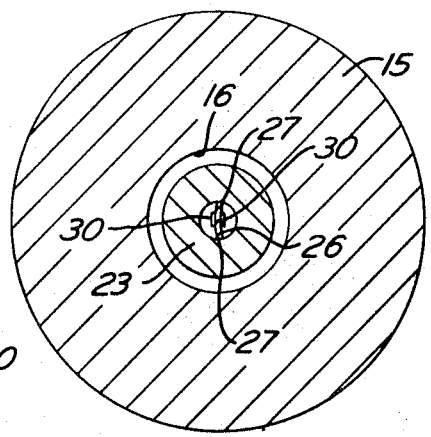
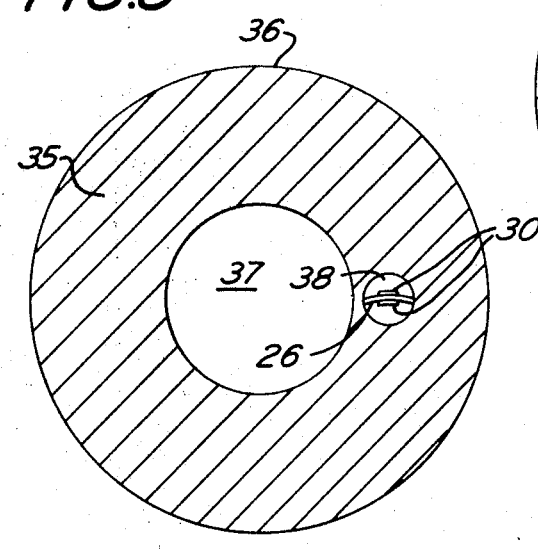
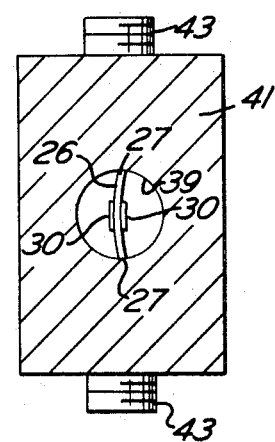
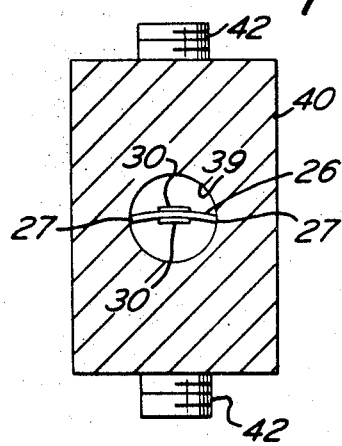
INVENTORS
JOHN C. BOWEN
HOWARD G. FISCHER, II
ATTORNEY

INVENTORS
JOHN C. BOWEN
HOWARD G. FISCHER, II

BY
ATTORNEY

INVENTORS
JOHN C. BOWEN
HOWARD G. FISCHER, II

BY
ATTORNEY

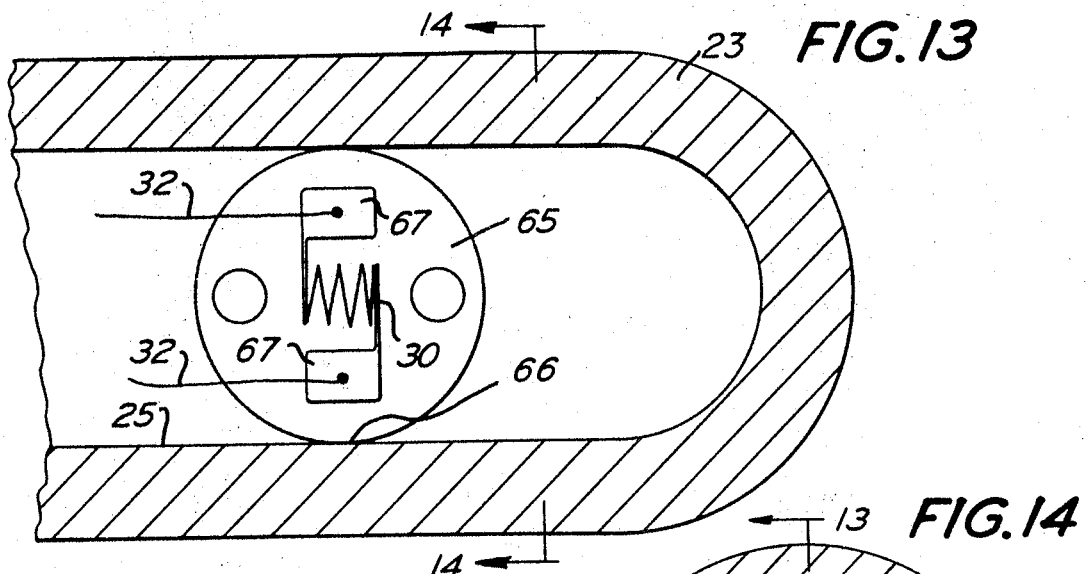
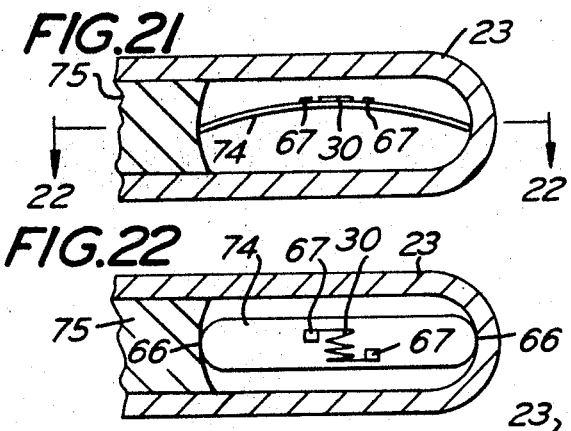
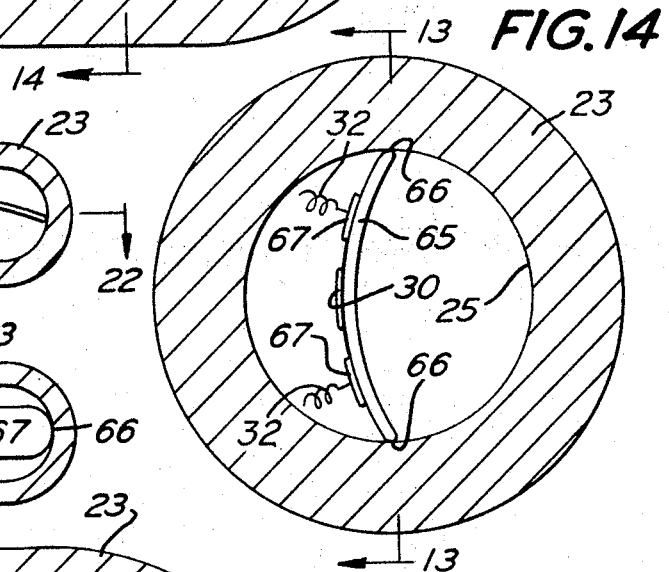
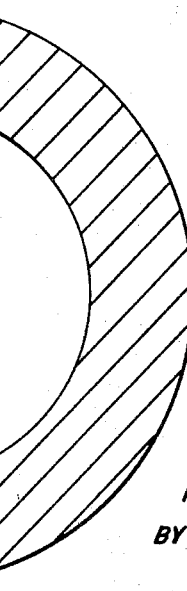
INVENTORS.
JOHN C. BOWEN
HOWARD G. FISCHER, II

INVENTORS.
JOHN C. BOWEN
HOWARD G. FISCHER, II
BY
ATTORNEY

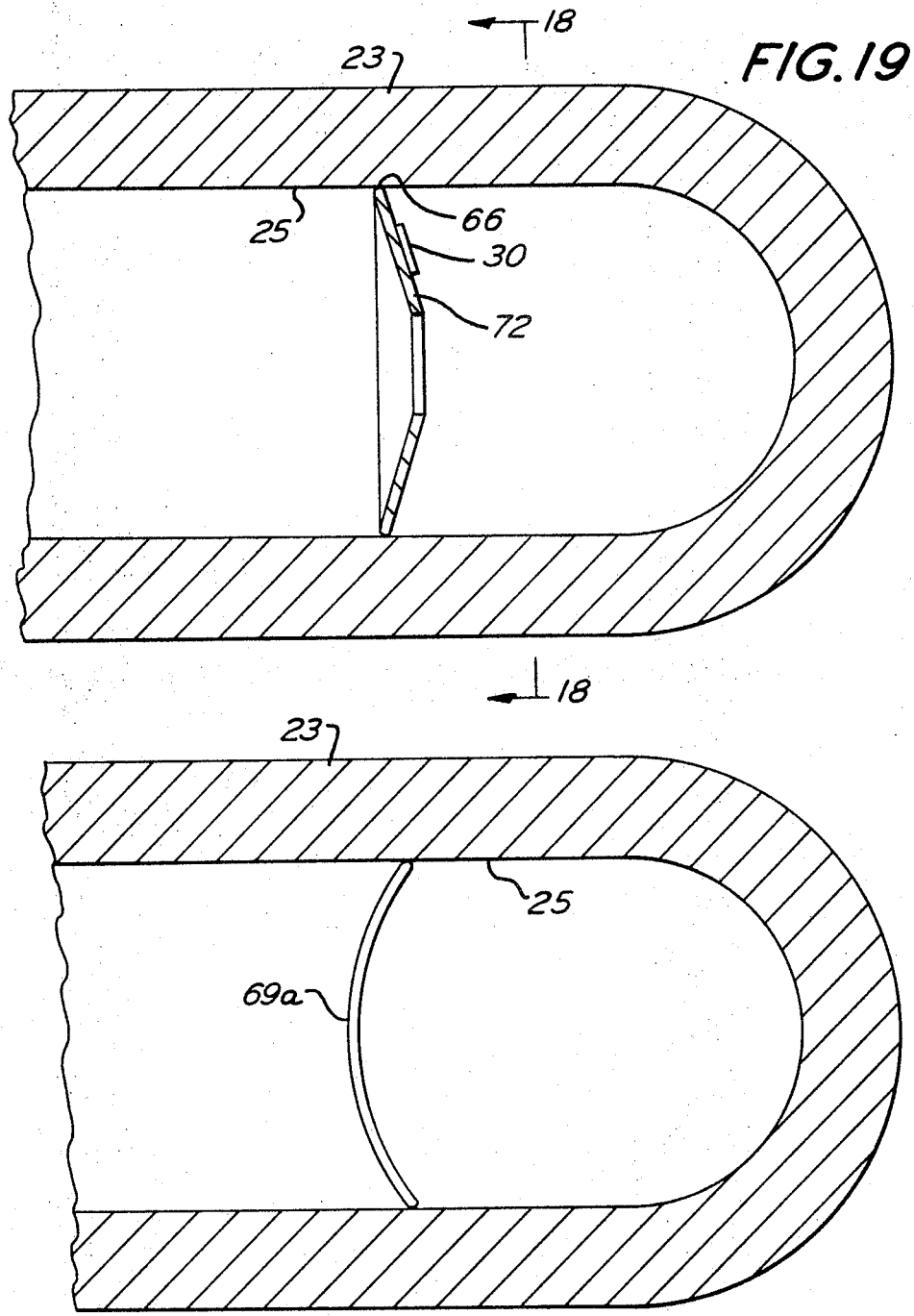

APPARATUS FOR HIGH PRESSURE MEASUREMENT

CROSS-REFERENCE TO RELATED APPLICATIONS

This application is a continuation in part of prior application for Apparatus for High Pressure Measurement, filed Apr. 22, 1968, Ser. No. 723,030, now abandoned.

BACKGROUND OF THE INVENTION

1. Field of the Invention

This invention relates to apparatus for high pressure measurement and more particularly to apparatus utilizing strain gauges in which an amplification or multiplication of the effect of the applied pressure is obtainable.

2. Description of the Prior Art

It has heretofore been proposed for pressure measurement to mount strain gauges of the bonded wire resistance type on opposite sides of an arcuate element to be stressed by pressure. Typical examples are found in the U.S. Pat. No. 2,419,061 to Emery, and U.S. Pat. No. 2,593,169, to Moore. It is advantageous for some purposes to employ a pair of strain gauges one of which acts in compression to employ a pair of strain gauges one of which acts in compression and the other of which acts in tension and to connect the same into a bridge circuit.

In other applications of strain gauges to high pressure measurement it has been proposed to fasten strain gauges directly by adhesives to an interior wall which is to be stressed. Difficulties have been encountered in such securement and if replacement is required this also involves difficulties.

Strain gauges have also been proposed in which the sensitive element consists of a silicon wafer upon which variable fluid pressure is applied to provide a signal. Gauges of this type are available from Honeywell Co., and are shown in U.S. Pat. No. 3,345,582 to J. T. Marysin.

SUMMARY OF THE INVENTION

In accordance with the invention one or more strain gauges are attached to a relatively thin plate, tube, or the like preferably arcuate, or a strain gauge in the form of a disc or plate, is removably inserted in an opening against the walls of which a pressure is applied from outside the opening.

It is the principal object of the present invention to provide apparatus for high pressure measurement which employs an insertable element with one or more strain gauges associated therewith, the insertable element being capable of manufacture in the plant to conform to predetermined standards for subsequent installation in the field.

It is a further object of the present invention to provide apparatus for high pressure measurement with which amplification or magnification is available if desired.

It is a further object of the present invention to provide apparatus for high pressure measurement which comprises as a component thereof an insertable element having the desired curvature and with one or more strain gauges previously attached thereto or incorporated therein.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a longitudinal sectional view of one form of apparatus in accordance with the invention and in which the sensitive element is separated from the fluid whose pressure is to be measured;

FIG. 2 is a transverse sectional view, enlarged, taken approximately on the line 2-2 of FIG. 1;

FIG. 3 is a transverse sectional view of a high pressure vessel having a sensitive element in accordance with the invention in the wall thereof;

FIG. 4 is a vertical sectional view of a test specimen having a transverse opening with a sensitive element in accordance with the invention carried thereon;

FIG. 5 is a view similar to FIG. 4 but showing a different orientation of the sensitive element;

FIG. 13 is a fragmentary longitudinal sectional view of a pressure applying element showing another type of mounting and taken approximately on the line 13-13 of FIG. 14;

FIG. 14 is a transverse sectional view taken approximately on the line 14-14 of FIG. 13;

FIG. 15 is a view similar to FIG. 13 but showing a different type of mounting plate;

FIG. 19 is a longitudinal sectional view of a pressure applying element showing the mounting plate of FIG. 18;

FIG. 20 is a view similar to FIG. 13 in which the strain gauge is a disc;

FIG. 21 is a longitudinal sectional view showing a different manner of supporting a mounting plate; and FIG. 22 is a longitudinal sectional view on the line 22-22 of FIG. 21.

Figure 6:
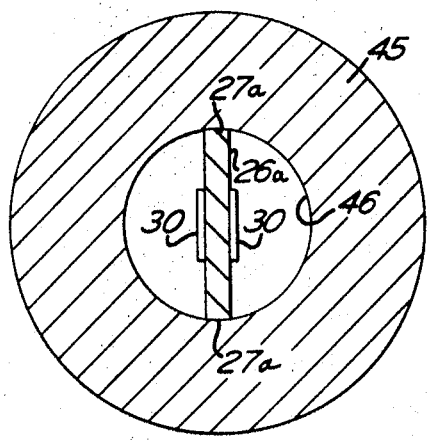
FIG. 6 is a cross-sectional view of an enclosed sensitive element subjected to compression.

It should, of course, be understood that the description and drawings herein are merely illustrative, and that various modifications and changes can be made in the structure disclosed without departing from the spirit of the inventions.

Like numerals refer to like parts throughout the several views.

DESCRIPTION OF THE PREFERRED EMBODIMENTS

Referring now more particularly to the drawings, a metal cylinder 15 is shown having a bore 16 with which a pressure fluid supply connection 17 is in communication for the application of fluid pressure at high level, of the order of 10,000 pounds per square inch and as high as 150,000 pounds per square inch.

The bore 16 has a larger bore 18 coaxial therewith terminating at an inner shoulder 19 with the outer end internally threaded as at 20 for the reception of a complementally threaded end plug 21.

The plug 21 has a central opening 22 therein for communication with the atmosphere if desired and bears against one end of an insertable well or pressure applying element 23 which has a shoulder 24 held against the shoulder 19 by the end plug 21.

The well 23 has an interior opening 25 aligned with the opening 22 and with slight taper converging toward the closed end of the well 23. The wall thickness of the well 23, surrounding the opening 25, is of course sufficient to accommodate the pressure applied thereon but also to permit of slight movement to change the size of the opening 25 with change of pressure.

The opening 25 has disposed therein an elongated mounting strip or plate 26, preferably arcuate in transverse cross section and has its marginal pressure or force receiving edges 27 in engagement with the interior of the well 23 in the opening 25. The strip or plate 26 is retained in place in any desired manner, such as by wedging, this being facilitated by the internal taper of the opening 25.

The mounting strip or plate 26 is preferably provided with variable resistance type strain gauges 30 on one or both sides thereof, as desired.

The strain gauges 30 may be of any desired type, such as bonded wire resistance, thin film, or semiconductor. The strain gauges are secured in place in any desired manner compatible with the type gauge which is employed, including with an adhesive, or by welding, so that when a plurality of gauges are employed, one gauge 30 will be placed in tension and the other will be placed in compression determined by the reduction or change of the distance between the edges 27.

The strain gauges 30 can have leads 32 extending to any desired instrument which may include a well-known Wheatstone Bridge circuit if desired.

Referring now to FIG. 3, the wall 35 of a pressure vessel 36 is illustrated having a central space 37 for high pressure fluids. In spaced relation to the space 37, a bore 38 is provided which is preferably not in communication with the space 37. The bore 38 is preferably slightly tapered and is adapted to carry, wedged therein, a mounting strip or pr plate 26 with strain gauges 30 as before.

The invention is not limited to fluid pressure measurement and in FIGS. 5 and 6, the mounting strip or plate 26 with strain gauges 30 thereon is shown mounted in openings 39 of blocks 40 and 41.

The block 40 may be subjected to tension applied on threaded ends 42, with resultant change in the distance between the edges 27 and attendant change of condition of the strain gauges 30.

The block 41 may be subjected to compression applied on its threaded ends 43 with resultant change in the distance between the edges 27 and attendant change in condition of the strain gauges 30.

Referring now to FIG. 6, in the form of the invention there shown a pressure or force receiving cylinder 45 is illustrated, subject to externally applied forces, and has an interior slightly tapered opening 46.

A mounting plate or strip 26a is illustrated having marginal ends 27a. The plate or strip 26a on one or both sides thereof is provided with strain gauges 30 which in this instance are subject only to compression.

Figure 7:
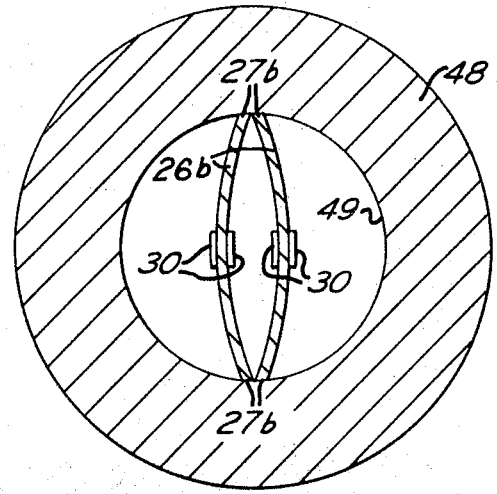
FIG. 7 is a cross-sectional view of an enclosed sensitive element with a different type of mounting.

In FIG. 7 another embodiment of the invention is illustrated, a force receiving element or cylinder 48 has a central slightly tapered opening 49. The mounting element disposed in the opening 49 comprises a pair of oppositely faced strips or plates 26b, with strain gauges 30 as before and with their marginal edges 27b engaged in the opening 49 for force application thereagainst.

Figure 8:
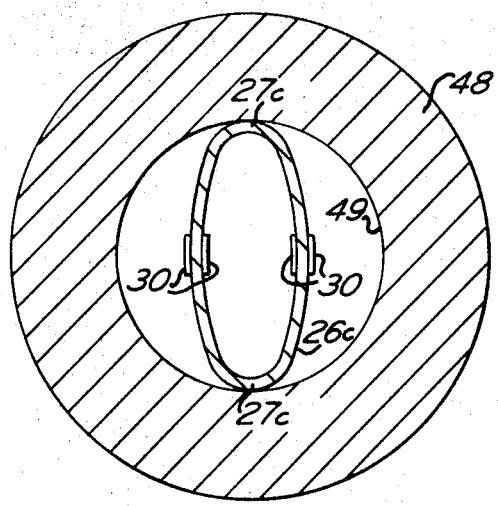
FIG. 8 is a view similar to FIG. 7 but with a still different type of mounting.

In FIG. 8, the force receiving element or cylinder 48 with its central opening 49 has a mounting element comprising a flattened tube 26c with ends 27c engaging the interior of the cylinder 48. The walls of the tube 26c, interiorly and exteriorly may be provided with strain gauges 30 for action in tension and compression.

Figure 9:
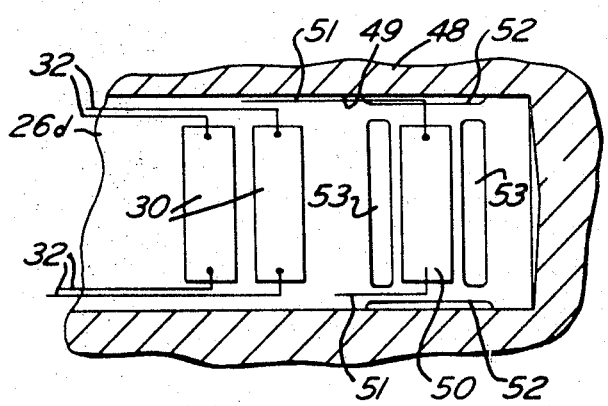
FIG. 9 is a cross-sectional view showing the sensitive element having a temperature measuring element associated therewith.

As shown in FIG. 9, the cylinder 48 to be subjected to external pressure has mounted in the opening 49 thereof a mounting plate or strip 26d preferably arcuate, like the strip or plate 26, and which in addition to strain gauges also has mounted thereon an electrothermal temperature responsive element 50 with insulated signal take off leads 51. Isolating marginal edge cut outs 52 are provided on the plate or strip 26 along the edges 27d and isolating openings 53 are provided on each side thereof.

Figure 10:
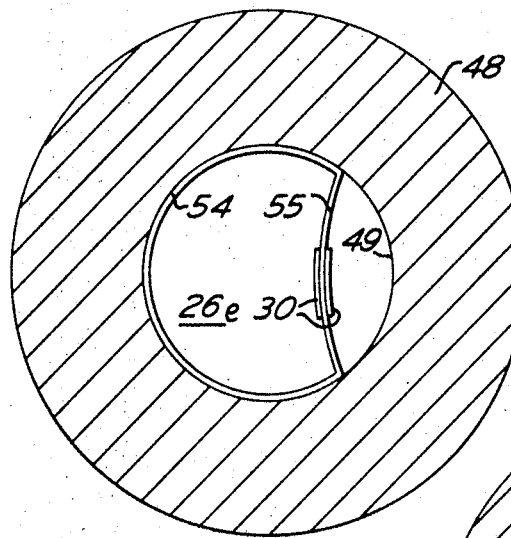
FIG. 10 is view similar to FIG. 7 showing another type of mounting.

As shown in FIG. 10, the cylinder 48 has mounted in the opening 49 thereof a mounting element 26e which comprises a tubular portion 54 having an inwardly concaved arcuate wall 55 with strain gauges 30 mounted on opposite sides thereof.

Figure 11:
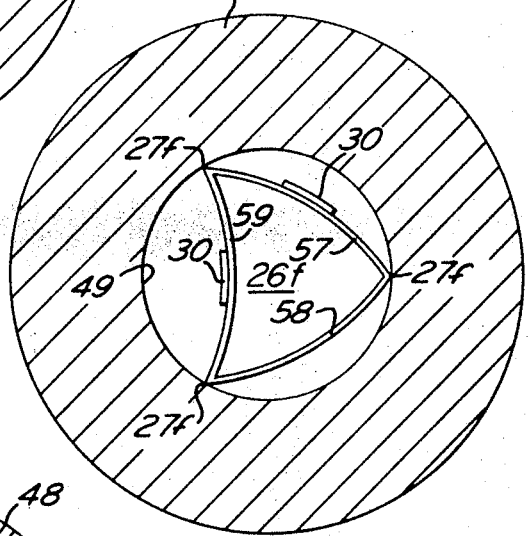
FIG. 11 is a view similar to FIG. 7 showing another type of mounting.
Figure 12:
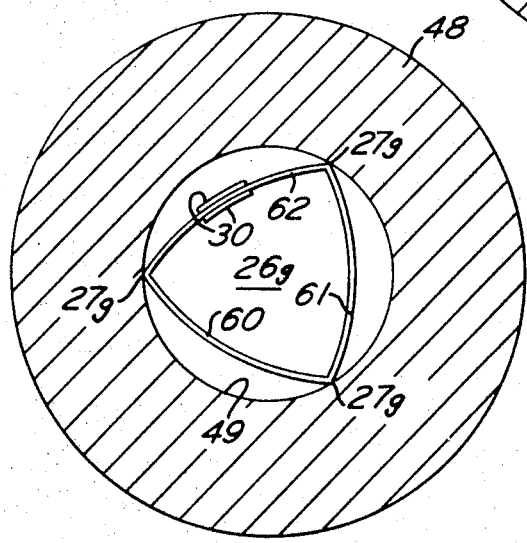
FIG. 12 is a view similar to FIG. 7 showing another type of mounting.

As shown in FIG. 11, the cylinder 48 has mounted in opening 49 a tubular mounting element 26f with a plurality of arcuate outwardly convexed wall portions 57 and 58 and an inwardly concaved wall portion 59. One convexed wall portion such as the wall portion 57 and one concaved wall portion such as the wall portion 59 have strain gauges 30 secured thereto for respective action in tension and compression upon reduction in diameter of the opening 49 and force application against the edges 27f.

The construction shown in FIG. 11 is similar to that of FIG. 10 except that the mounting element 26g has all the wall portions 60, 61 and 63 thereof convexed outwardly and with one of the wall portions such as the wall portion 62 having strain gauges 30 secured on both the inner and outer faces thereof for action upon force change on the edges.

As shown in FIGS. 13 and 14 the well 23 has mounted in opening 25 a curved disc 65 preferably having a transversely curved marginal edge 66, with strain gauge 30 secured thereto. Soldering pads 67 to which the strain gauge 30 is connected may also be provided for attachment of leads 32. The shape of the edge 66 provides point contacts at the locations of engagement with the opening 25.

As shown in FIG. 15 the mounting plate 69 has longitudinally and transversely curved end marginal edges 66, between which it is curved, and straight side edges 70 to provide a uniform beam at that location with enhanced linearity of signal.

Figure 16:
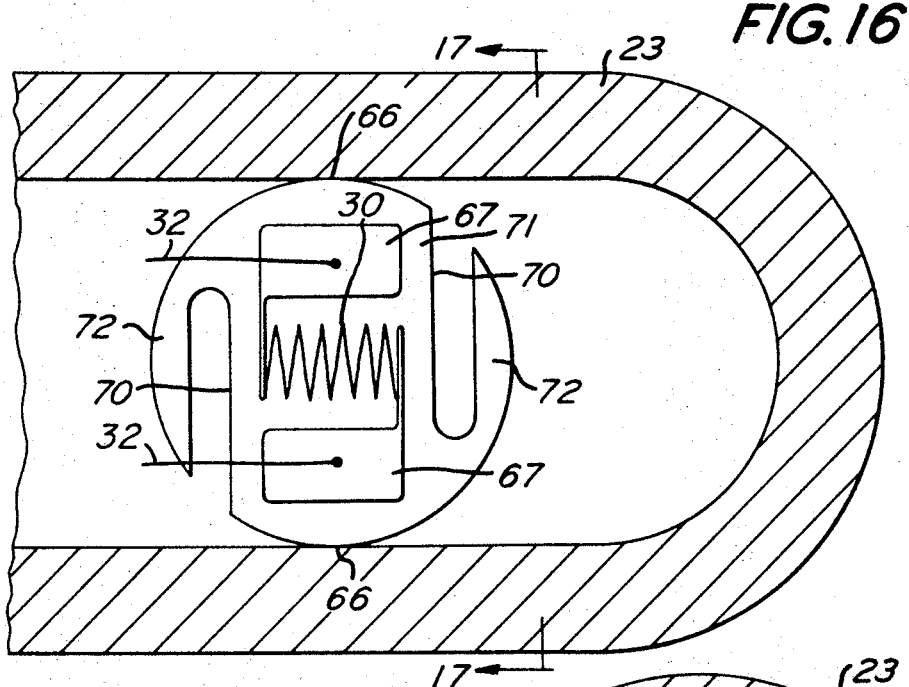
FIG. 16 is a view similar to FIG. 13 showing another type of mounting plate.
Figure 17:
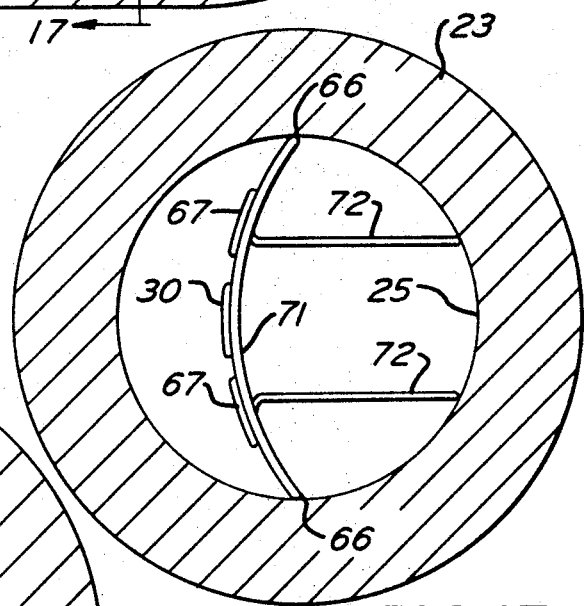
FIG. 17 is transverse sectional view showing the mounting plate of FIG. 16 with its tabs bent to retaining position.

As shown in FIGS. 16 and 17, the mounting plate 71 is similar to the plate 69 but has bendable tabs 72 which when disposed as shown in FIG. 17 retain the disc 71 against rocking while providing point contact.

Figure 18:
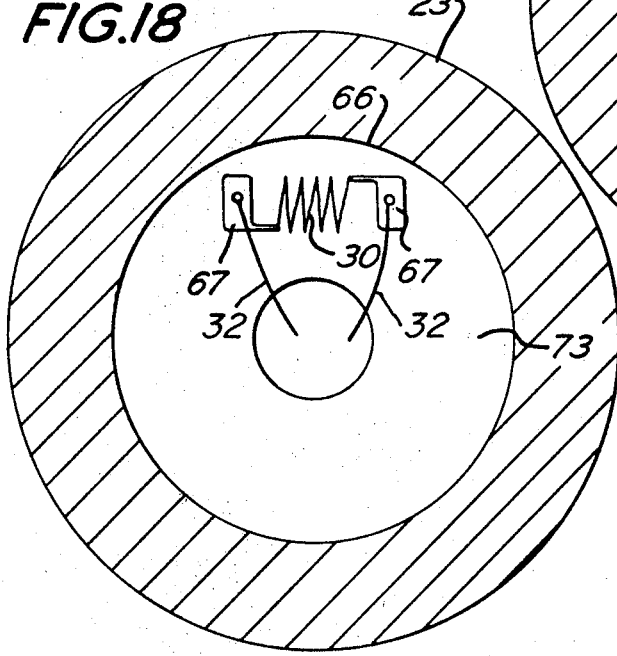
FIG. 18 is a transverse sectional view taken approximately on the line 18-18 of FIG. 19 and showing another type of mounting plate.

As shown in FIGS. 18 and 19, the mounting plate 73 is in the form of a Belleville washer, with transversely rounded edges 66 to provide line contact.

As will be seen in FIG. 20, the strain gauge 69a may be a wafer of silicon material such as is disclosed in U.S. Pat. No. 3,345,582, to J. T. Maupin, which transmits a variable signal upon change of the shape thereof upon compression. While any desired shape can be used the shape of the gauge 69a is preferably the same as that of the mounting plate 69.

In FIGS. 21 and 22 the mounting plate 74 is similar to the mounting plate 69 as shown in FIG. 15, with a strain gauge 30 and soldering pads but differently oriented. The mounting plate 74 is engaged at its ends 66 respectively with the inner end of the well 23 and with a plug 75.

In all the forms of mounting element heretofore described the assembly can be made up in the shop rather than in the field, and inserted or replaced as desired, separated from the actual force or pressure applying source and with a multiplying or amplifying action available.

We claim:

1. Apparatus for force measurement comprising a member on which a force is applied,
    said member having an interior opening subject to change in shape upon force application on said member, and
    strain responsive signal providing means having portions in engagement in said opening,
    said means including a mounting member having the central portion thereof offset with respect to said portions in engagement in said opening.

2. Apparatus for force measurement comprising
    a member on which a force is applied,
    said member having an interior opening subject to change in shape upon force application on said member, and
    strain responsive signal providing means having portions in engagement in said opening,
    said interior opening being tapered for retention of said means therein.

3. Apparatus for force measurement comprising
    a member on which a force is applied,
    said member having an interior opening subject to change in shape upon force application on said member, and
    strain responsive signal providing means having portions in engagement in said opening, said means including a mounting member having a wall portion with margins engaged in said opening and with the central portion of said wall portion offset with respect to said margins and being subject to change in shape upon force application on said first member, and a strain gauge secured to said mounting member and controlled thereby.

4. Apparatus for force measurement as defined in claim 3 in which said mounting member includes a tubular portion with a curved wall in spaced relation intermediate its margins to said opening.

5. Apparatus for force measurement as defined in claim 3 in which said mounting member has a plurality of curved wall portions with their meeting portions engaged in said opening.

6. Apparatus for force measurement as defined in claim 3 in which said mounting member has marginal portions in point contact in said opening.

7. Apparatus for force measurement as defined in claim 1 in which said mounting member has marginal portions in line contact in said opening 8. Apparatus for force measurement as defined in claim 3 in which said mounting member is longitudinally disposed in said interior opening.

9. Apparatus for force measurement as defined in claim 8 in which a plug member is provided in said opening in retaining engagement with said mounting member.

10. Apparatus for force measurement as defined in claim 3 in which said mounting member is transversely disposed in said opening.

11. Apparatus for force measurement comprising a member on which a force is applied, said member having an interior opening subject to change in shape upon force application on said member, and strain responsive signal providing means having portions in engagement in said opening, said means including a mounting member having a wall portion with margins engaged in said opening and subject to change in shape upon force application on said first member, said mounting member being a strip, and a strain gauge secured to said mounting member and controlled thereby.

12. Apparatus for force measurement as defined in claim 11 in which said mounting member is elongated and said wall portion is curved between said margins.

13. Apparatus for force measurement as defined in claim 12 in which said mounting member has said strain gauge mounted on a concave face thereof.

14. Apparatus for force measurement as defined in claim 13 in which said mounting member has an additional strain gauge mounted on a convex face thereof.

15. Apparatus for force measurement as defined in claim 12 in which said mounting member has said strain gauge on a convex face thereof.

16. Apparatus for force measurement comprising a member having an interior fluid space on which a force is applied, said member having an interior opening subject to change in shape upon force application on said member, and strain responsive signal providing means having portions in engagement in said opening, said means including a mounting member having a wall portion with margins engaged in said opening and subject to change in shape upon force application on said first member, and a strain gauge secured to said mounting member and controlled thereby, said first member being tubular with an interior fluid space, and said opening being in spaced relation to said interior fluid space.

17. Apparatus for force measurement comprising a member on which a force is applied, said member having an interior opening subject to change in shape upon force application on said member, and strain responsive signal providing means having portions in engagement in said opening, said means including a mounting member having a wall portion with margins in edge contact in said opening and subject to change in shape upon force application on said first member, and a strain gauge secured to said mounting member and controlled thereby.

18. Apparatus for force measurement comprising a member on which a force is applied, said member having an interior opening subject to change in shape upon force application on said member, and strain responsive signal providing means having portions in engagement in said opening, said means including a mounting member having a wall portion with margins engaged in said opening and subject to change in shape upon force application on said first member, and a strain gauge secured to said mounting member and controlled thereby, said mounting member having a uniform beam portion at the location at which said strain gauge is mounted.